(No Model.)

W. P. CLARK.
COTTON CHOPPER.

No. 407,512. Patented July 23, 1889.

WITNESSES:
Chas. Niac
C. Sedgwick

INVENTOR:
W. P. Clark
BY Munn & Co.
ATTORNEYS.

UNITED STATES PATENT OFFICE.

WILLIAM P. CLARK, OF ELBERTON, GEORGIA.

COTTON-CHOPPER.

SPECIFICATION forming part of Letters Patent No. 407,512, dated July 23, 1889.

Application filed December 1, 1888. Serial No. 292,408. (No model.)

*To all whom it may concern:*

Be it known that I, WILLIAM P. CLARK, of Elberton, in the county of Elbert and State of Georgia, have invented a new and Improved Cotton-Chopper, of which the following is a full, clear, and exact description.

This invention relates to cotton-choppers of the class shown in Letters Patent of the United States No. 376,294, granted to me on the 10th day of January, 1888, the object of the present invention being to provide for the adjustment of the knives or cutters, and to so construct and arrange the parts that the cutter-shaft may be driven positively by gearing, or by frictional contact with the driving-wheel, all as will be hereinafter more fully explained, and specifically pointed out in the claims.

Reference is to be had to the accompanying drawings, forming a part of this specification, in which similar figures and letters of reference indicate corresponding parts in all the views.

Figure 1:
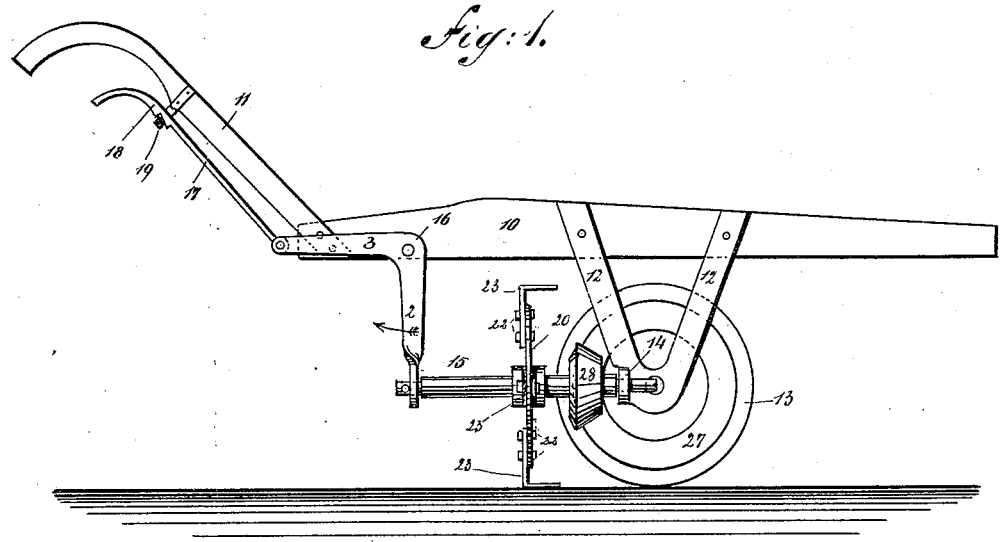
Figure 2:
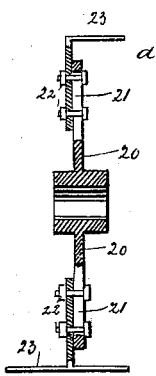
Figure 3:
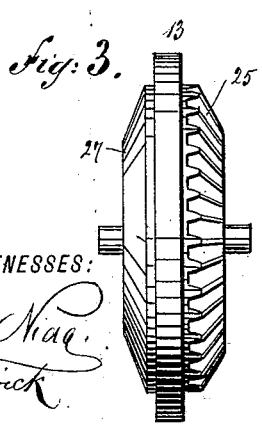
Figure 4:
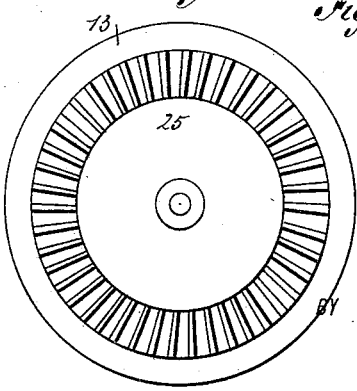
Figure 5:
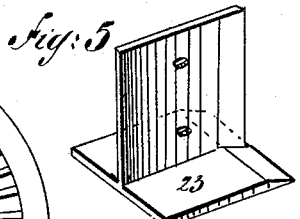

Figure 1 is a side view of a cotton-chopper constructed in accordance with the terms of my invention, parts being broken away. Fig. 2 is a central sectional view of the knife-supporting disk. Fig. 3 is an edge view of the driving-wheel. Fig. 4 is a view of one of the side faces of said wheel, and Fig. 5 is a perspective view of one form of knife or chopper.

In the drawings, 10 represents the beam, to which the handles 11 are secured in the ordinary manner. To the beam 10 there are connected hangers 12, which serve as supports for the driving-wheel 13, one of the hangers being provided with a lug 14, which serves as a bearing for one end of the cutter-shaft 15, the other end of said shaft being journaled in the downwardly-extending arm 2 of a bell-crank lever 16, said lever being pivotally connected to the beam 10 just in advance of the handles 11.

To the horizontal arm 3 of the lever 16 there is connected an operating-rod 17, having teeth 18, that engage a stirrup 19, through which the rod passes, said stirrup being secured to one of the handles.

Upon the shaft 15 there is mounted a disk 20, formed with radial slots 21, said slots being arranged to receive the bolts 22, by which the knives or cutters 23 are connected to the disk. These knives or cutters 23 may be L-shaped, as shown at $a$ in Fig. 2; or they may be T-shaped, as shown at $b$ in the same figure. It will be noticed that the slots 21 are longer than the space between each set of bolts 22, so that the blades may be adjusted toward or from the shaft 15, thus providing for a regulation of the depth of the cut.

To one side of the driving-wheel 13 there is secured a bevel-gear 25, and upon the shaft 15 there is secured a bevel-pinion, which engages said gear when the shaft 15 is in the position shown in Fig. 1; but if the rod 17 be drawn upward and the lever 16 in the direction of its arrow the pinion carried by the shaft 15 will drawn out of engagement with the gear 25.

The pinion and gear are employed when it is desired to impart a positive motion to the shaft 15, which motion is desirable when the ground is very heavy; but ordinarily I drive the shaft 15 by means of a bevel friction-ring 27, that is secured to the driving-wheel, said ring running in engagement with a bevel friction-disk 28, that is carried by the shaft 15, the position of the wheel 13 being reversed when it is desired to change from a positive to a frictional connection, or vice versa, it being of course understood that a corresponding change would be made in regard to the driving disk or pinion carried by the shaft 15.

Having thus described my invention, I claim as new and desire to secure by Letters Patent—

1. In a cotton-chopper, the combination, with a beam and hangers secured thereto, of a drive-wheel journaled in said hangers, a bell-crank lever pivoted to the rear end of the beam, a shaft journaled in said bell-crank lever, and a bracket on one of the hangers, a disk provided with adjustable cutters secured to the shaft, and means for operating the shaft from the drive-wheel, substantially as herein shown and described.

2. A driving-wheel for cotton-choppers, provided with a gear upon one face and a friction-ring upon the other, substantially as described.

3. In a cotton-chopper, the combination of the driving-wheel provided with a gear upon one face and a friction-ring upon the other face, a cutter-shaft, and interchangeable pinion and friction-disk adapted to be secured on said shaft, substantially as and for the purpose set forth.

WILLIAM P. CLARK.

Witnesses:
ISAAC G. SWIFT,
JOHN H. CRAIG.